(12) United States Patent
Chen

(10) Patent No.: US 6,546,522 B1
(45) Date of Patent: Apr. 8, 2003

(54) SIGNAL-TO-NOISE RATIO OPTIMIZATION OF MULTIPLE-RESPONSE DESIGN-OF-EXPERIMENT

(75) Inventor: Ming-Ru Chen, Hsin-Chu (TW)

(73) Assignee: United Microelectronics Corp., Hsin-Chu (TW)

( * ) Notice: Subject to any disclaimer, the term of this patent is extended or adjusted under 35 U.S.C. 154(b) by 0 days.

(21) Appl. No.: 09/369,905

(22) Filed: Aug. 6, 1999

(51) Int. Cl.$^7$ ............................................... G05B 17/00

(52) U.S. Cl. ......................................................... 716/2

(58) Field of Search ............................. 703/2; 324/456

(56) References Cited

U.S. PATENT DOCUMENTS 5,410,254 A * 4/1995 Consiglio .................... 324/456
5,974,246 A * 10/1999 Nakazawaa ..................... 703/2

* cited by examiner

Primary Examiner—Matthew Smith
Assistant Examiner—Thuan Do

(57) ABSTRACT

A method for evaluating design-of-experiment is disclosed. The method includes an optimization method for use in fabricating a semiconductor integration circuit device, wherein the factors are simplified as a single number. The solution procedure is described as the related statement using some cases related about polysilicon deposition and device fabrication process as the sample to illustrate the implementation of this invention. Also, in the embodiment, the present invention is proposed to solve the problem of uncertain preferences from decision-makers. This invention will optimize the weight or the relative importance of each attribute with respect to process conditions and thus does not need any preference from process engineers herein. Therefore, according to the above description, this invention is for solving multiple-criteria problems of very-large-semiconductor-integration (VLSI) manufacturing process. Generally VLSI process optimization is inherently a multiple-objectives problem because the process engineers always want to attain more than one objective at the same time. Especially, the Taguchi Method is the most effective design-of-experiments (DOE) method but its application is limited to single-objective problem only. The proposed method assigns an Orthogonal Array (OA) as the weight array to each experimental condition and the optimum weights are obtained when the defined quality index is optimized. This method leads to a unique solution and thus eliminates the uncertainty of decision makers' expressing preference.

12 Claims, 17 Drawing Sheets

| Expt# NO. | Temperature | Pressure | Nitrogen | Silane | Settling Time | Cleaning Method |
|---|---|---|---|---|---|---|
| 1 | $T_0-25$ | $P_0-200$ | $N_0$ | $S_0-100$ | $t_0$ | None |
| 2 | $T_0-25$ | $P_0$ | $N_0-150$ | $S_0-50$ | $t_0+8$ | $CM_2$ |
| 3 | $T_0-25$ | $P_0+200$ | $N_0-75$ | $S_0-50$ | $t_0+16$ | $CM_2$ |
| 4 | $T_0$ | $P_0-200$ | $N_0$ | $S_0-50$ | $t_0+8$ | $CM_2$ |
| 5 | $T_0$ | $P_0$ | $N_0-150$ | $S_0-100$ | $t_0+16$ | None |
| 6 | $T_0$ | $P_0+200$ | $N_0-75$ | $S_0-100$ | $t_0$ | $CM_2$ |
| 7 | $T_0+25$ | $P_0-200$ | $N_0$ | $S_0-100$ | $t_0+16$ | $CM_2$ |
| 8 | $T_0+25$ | $P_0$ | $N_0-150$ | $S_0-50$ | $t_0$ | $CM_2$ |
| 9 | $T_0+25$ | $P_0+200$ | $N_0-75$ | $S_0-50$ | $t_0+8$ | None |
| 10 | $T_0-25$ | $P_0-200$ | $N_0-75$ | $S_0-100$ | $t_0+8$ | $CM_2$ |
| 11 | $T_0-25$ | $P_0$ | $N_0$ | $S_0-50$ | $t_0+16$ | None |
| 12 | $T_0-25$ | $P_0+200$ | $N_0-150$ | $S_0-50$ | $t_0$ | None |
| 13 | $T_0$ | $P_0-200$ | $N_0-75$ | $S_0-100$ | $t_0+8$ | $CM_2$ |
| 14 | $T_0$ | $P_0$ | $N_0$ | $S_0-50$ | $t_0+16$ | $CM_2$ |
| 15 | $T_0$ | $P_0+200$ | $N_0-150$ | $S_0-100$ | $t_0$ | $CM_2$ |
| 16 | $T_0+25$ | $P_0-200$ | $N_0-75$ | $S_0-100$ | $t_0+16$ | None |
| 17 | $T_0+25$ | $P_0$ | $N_0$ | $S_0-50$ | $t_0$ | $CM_2$ |
| 18 | $T_0+25$ | $P_0+200$ | $N_0-150$ | $S_0-100$ | $t_0+8$ | None |

FIG.2

| Expt# | defect | S/N Ratio thick | rate | *e |
|---|---|---|---|---|
| 1 | 0.51 | 35.22 | 23.23 | 0 |
| 2 | -37.3 | 35.76 | 31.27 | 0 |
| 3 | -45.17 | 36.02 | 32.34 | 0 |
| 4 | -25.76 | 42.25 | 31.15 | 0 |
| 5 | -62.54 | 21.43 | 37.27 | 0 |
| 6 | -62.23 | 32.91 | 33.89 | 0 |
| 7 | -59.88 | 21.39 | 37.68 | 0 |
| 8 | -71.69 | 22.84 | 40.46 | 0 |
| 9 | -68.15 | 30.6 | 41.21 | 0 |
| 10 | -3.47 | 26.85 | 27.89 | 0 |
| 11 | -5.08 | 38.8 | 26.02 | 0 |
| 12 | -54.85 | 38.06 | 31.82 | 0 |
| 13 | -49.38 | 32.07 | 34.5 | 0 |
| 14 | -36.54 | 43.34 | 33.2 | 0 |
| 15 | -64.18 | 37.44 | 34.76 | 0 |
| 16 | -27.13 | 31.86 | 37.71 | 0 |
| 17 | -71.51 | 22.01 | 40.45 | 0 |
| 18 | -72 | 18.42 | 39.22 | 0 |

FIG.3

* empty column is denoted by e.

| Expt# | defect | thick rate | Normalized S/N *e |
|---|---|---|---|
| 1 | 1.000 | 0.674 | 0.000 | 0 |
| 2 | 0.479 | 0.696 | 0.447 | 0 |
| 3 | 0.370 | 0.706 | 0.507 | 0 |
| 4 | 0.638 | 0.956 | 0.440 | 0 |
| 5 | 0.130 | 0.121 | 0.781 | 0 |
| 6 | 0.135 | 0.581 | 0.593 | 0 |
| 7 | 0.167 | 0.119 | 0.804 | 0 |
| 8 | 0.004 | 0.177 | 0.958 | 0 |
| 9 | 0.053 | 0.489 | 1.000 | 0 |
| 10 | 0.945 | 0.338 | 0.259 | 0 |
| 11 | 0.923 | 0.818 | 0.155 | 0 |
| 12 | 0.237 | 0.788 | 0.478 | 0 |
| 13 | 0.312 | 0.548 | 0.627 | 0 |
| 14 | 0.489 | 1.000 | 0.555 | 0 |
| 15 | 0.108 | 0.763 | 0.641 | 0 |
| 16 | 0.619 | 0.539 | 0.805 | 0 |
| 17 | 0.007 | 0.144 | 0.958 | 0 |
| 18 | 0.000 | 0.000 | 0.889 | 0 |

FIG.4

| Weight Array | | | |
|---|---|---|---|
| 1 | 2 | 3 | 4 |
| 1 | 1 | 1 | 1 |
| 1 | 2 | 2 | 2 |
| 1 | 3 | 3 | 3 |
| 2 | 1 | 2 | 3 |
| 2 | 2 | 3 | 1 |
| 2 | 3 | 1 | 2 |
| 3 | 1 | 3 | 2 |
| 3 | 2 | 1 | 3 |
| 3 | 3 | 2 | 1 |

FIG.5

|  | Starting Condition | Phadke's Study | | This Work | |
|---|---|---|---|---|---|
|  | S/N(dB) | S/N(dB) | Gain(dB) | S/N(dB) | Gain(dB) |
| Surface Defects | -56.69 | -19.84 | 36.85 | 7.02 | 63.71 |
| Thickness | 29.95 | 36.79 | 6.84 | 44.76 | 14.81 |
| Deposition Rate | 34.97 | 29.60 | -5.37 | 25.62 | -9.35 |

FIG. 9(A)

|  | Starting Condition | Phadke's Study | Improvement | This Work | Improvement |
|---|---|---|---|---|---|
| Surface Defects (#/cm2) | 600 | 7 | 2 orders | 0.63 | 3 orders |
| Thickness (std.dev.) | 2.8% | 1.3% | 54% | 0.6% | 80% |
| Deposition Rate | 3.56 | 3.09 | -13% | 19.1 | -45% |

FIG.9(B)

| Factor | Level | | |
|---|---|---|---|
| | 1 | 2 | 3 |
| A. NLDD anneal temp.(°C) | 900 | 800 | |
| B. APT implant dose($cm^{-2}$) | 5.5e12 | 5.0e12 | 4.5e12 |
| C. NLDD implant energy(KeV) | 60 | 50 | 40 |
| D. NLDD implant dose($cm^{-2}$) | 7.5e12 | 5.0e12 | 2.5e12 |
| E. NLDD implant tilt-angle(°) | 30 | 15 | 7 |
| F. HALO implant energy(KeV) | 90 | 100 | 110 |
| G. HALO implant dose($cm^{-2}$) | 1.0e12 | 2.0e12 | 3.0e12 |
| H. HALO implant tilt-angle(°) | 15 | 30 | 45 |

FIG.11

| Parameter | Condition |
|---|---|
| Vth | Vsub=0V, Vds=0.1, max.slope method |
| DIBL | DIBL=(Vth,0.1v−Vth,2.5v)/(2.5V−0.1V) |
| Vbd | Vsub=0V, Vgs=0V, measure VD@Id=1µA |
| Isat | Vsub=0V, Vd=Vg=2.5V |
| Ioff | Vsub=0V, Vgs=0V, Vd=2.5V |
| Isub | Vsub=0V, Vds=2.5V, Vg=0−2.5V, max.Isub |

FIG.12

| Expt No. | Factor | | | | | | | |
|---|---|---|---|---|---|---|---|---|
| | A | B | C | D | E | F | G | H |
| 1 | 1 | 1 | 1 | 1 | 1 | 1 | 1 | 1 |
| 2 | 1 | 1 | 2 | 2 | 2 | 2 | 2 | 2 |
| 3 | 1 | 1 | 3 | 3 | 3 | 3 | 3 | 3 |
| 4 | 1 | 2 | 1 | 1 | 2 | 2 | 3 | 3 |
| 5 | 1 | 2 | 2 | 2 | 3 | 3 | 1 | 1 |
| 6 | 1 | 2 | 3 | 3 | 1 | 1 | 2 | 2 |
| 7 | 1 | 3 | 1 | 2 | 1 | 3 | 2 | 3 |
| 8 | 1 | 3 | 2 | 3 | 2 | 1 | 3 | 1 |
| 9 | 1 | 3 | 3 | 1 | 3 | 2 | 1 | 2 |
| 10 | 2 | 1 | 1 | 3 | 3 | 2 | 2 | 1 |
| 11 | 2 | 1 | 2 | 1 | 1 | 3 | 3 | 2 |
| 12 | 2 | 1 | 3 | 2 | 2 | 1 | 1 | 3 |
| 13 | 2 | 2 | 1 | 2 | 3 | 1 | 3 | 2 |
| 14 | 2 | 2 | 2 | 3 | 1 | 2 | 1 | 3 |
| 15 | 2 | 2 | 3 | 1 | 2 | 3 | 2 | 1 |
| 16 | 2 | 3 | 1 | 3 | 2 | 3 | 1 | 2 |
| 17 | 2 | 3 | 2 | 1 | 3 | 1 | 2 | 3 |
| 18 | 2 | 3 | 3 | 2 | 1 | 2 | 3 | 1 |

FIG.13

| Expt# | $V_{th}$ | DIBL | $V_{bd}$ | $I_{sat}$ | $I_{off}$ | $I_{sub}$ |
|---|---|---|---|---|---|---|
| 1 | 21.4 | −36.6 | 16 | 54.8 | −69.1 | −28.2 |
| 2 | 34.4 | −25.6 | 15.7 | 50.5 | 20.1 | −19.5 |
| 3 | 38 | −19.6 | 15.8 | 47.2 | 33.3 | −16.5 |
| 4 | 31 | −29.2 | 15.7 | 51.6 | 10.7 | −22 |
| 5 | 33.3 | −23.5 | 15.8 | 50.2 | 20.1 | −17.8 |
| 6 | 32.4 | −22.2 | 16.2 | 49.4 | 20.6 | −16.2 |
| 7 | 25.8 | −33.2 | 16.1 | 53.2 | −29.9 | −23.5 |
| 8 | 39 | −21.3 | 16.4 | 49.1 | 23.4 | −15.2 |
| 9 | 35.1 | −25.1 | 15.7 | 50.7 | 18.5 | −21.2 |
| 10 | 36.1 | −19.9 | 16.2 | 48.6 | 25.2 | −8.3 |
| 11 | 28.7 | −31.3 | 15.7 | 52.4 | −2.2 | −24.5 |
| 12 | 35.9 | −23.4 | 15.7 | 50 | 23.3 | −22.8 |
| 13 | 33.8 | −22.8 | 15.7 | 49.3 | 26.7 | −14.8 |
| 14 | 31.4 | −23.4 | 16.3 | 50.1 | 15 | −17.5 |
| 15 | 34 | −25.2 | 15.7 | 50.7 | 19.7 | −22.1 |
| 16 | 38.5 | −21.9 | 16.5 | 49.7 | 19.7 | −14 |
| 17 | 36.3 | −24.1 | 15.7 | 49.9 | 26.2 | −19.9 |
| 18 | 34.2 | −26.7 | 15.7 | 51.4 | 7.4 | −22.4 |

FIG.14

| Expt # | $V_{th}$ | DIBL | $V_{bd}$ | $I_{sat}$ | $I_{off}$ | $I_{sub}$ | MRSN |
|---|---|---|---|---|---|---|---|
| 1 | 0 | 0 | 0.42 | 1 | 0 | 0 | 4.38 |
| 2 | 0.74 | 0.65 | 0 | 0.43 | 0.87 | 0.43 | 9.27 |
| 3 | 0.94 | 1 | 0.18 | 0 | 1 | 0.58 | 10.94 |
| 4 | 0.55 | 0.44 | 0 | 0.58 | 0.78 | 0.31 | 7.9 |
| 5 | 0.67 | 0.77 | 0.07 | 0.39 | 0.87 | 0.52 | 9.8 |
| 6 | 0.62 | 0.85 | 0.63 | 0.29 | 0.88 | 0.6 | 11.53 |
| 7 | 0.25 | 0.2 | 0.56 | 0.79 | 0.38 | 0.24 | 7.3 |
| 8 | 1 | 0.9 | 0.83 | 0.25 | 0.9 | 0.65 | 13.48 |
| 9 | 0.78 | 0.68 | 0 | 0.47 | 0.86 | 0.35 | 9.29 |
| 10 | 0.83 | 0.98 | 0.56 | 0.18 | 0.92 | 1 | 13.32 |
| 11 | 0.42 | 0.31 | 0 | 0.68 | 0.65 | 0.18 | 6.71 |
| 12 | 0.82 | 0.77 | 0 | 0.37 | 0.9 | 0.27 | 9.29 |
| 13 | 0.7 | 0.81 | 0 | 0.28 | 0.94 | 0.67 | 10.08 |
| 14 | 0.57 | 0.78 | 0.77 | 0.39 | 0.82 | 0.53 | 11.51 |
| 15 | 0.71 | 0.67 | 0 | 0.46 | 0.87 | 0.3 | 8.95 |
| 16 | 0.97 | 0.86 | 1 | 0.33 | 0.87 | 0.71 | 14.12 |
| 17 | 0.84 | 0.73 | 0 | 0.36 | 0.93 | 0.42 | 9.73 |
| 18 | 0.73 | 0.58 | 0 | 0.55 | 0.75 | 0.29 | 8.62 |

FIG.15

| Parameter | Initial Condition | Optimum Condition | Improvement |
|---|---|---|---|
| $V_{th}(V)$ Std.dev. $(3\sigma)$ | 0.58 11.4% | 0.58 5.7% | - 50% |
| DIBL(mV/V) | 38.8 | 12 | 70% |
| $V_{bd}(V)$ | 6.1 | 6.7 | 10% |
| $I_{sat}$ ($\mu A/\mu m$) | 475 | 337 | -30% |
| $I_{off}$ (pA/$\mu m$) | 2.665 | 0.375 | 90% |
| $I_{sub}$ ($\mu A/\mu m$) | 21 | 6.04 | 70% |

FIG.16

SIGNAL-TO-NOISE RATIO OPTIMIZATION OF MULTIPLE-RESPONSE DESIGN-OF-EXPERIMENT

BACKGROUND OF THE INVENTION

1. Field of the Invention

The method relates to solutions for the multiple-criteria problems of very-large-semiconductor-integration (VLSI) manufacturing processes. More particularly, the present invention relates to a multiple-criteria approach using Orthogonal Array and Taguchi method to achieve optimization required.

2. Description of the Prior Art

The semiconductor manufacturing process is inherently a multiple-criteria optimization problem because the processing engineers always would like to attain more than one criterion at the same time. Nevertheless only few researchers have attempted to solve this problem with multiple-criteria decision making approach.

Conventionally the multi-response problem is solved by forming a total-response function that is defined as:

$$f = \Sigma(\omega_i \times f_i)$$

Where $\omega_i$ is the weight assigned to response $f_i$, and indicates the relative importance of $f_i$. The multi-response problem is then solved by optimizing the total-response function.

Different assignment of $\omega_i$ will result in a different optimization solution. For example, for a three-response problem if an equal weight is assigned to each response then the total-response function is:

$$f = f_1 + f_2 + f_3$$

However, if the weight-ratio is changed to 2:1:1, the total-response function becomes:

$$f = 2 \times f_1 + f_2 + f_3$$

Therefore, the solution is not unique by the above conventional method. Also, from the conventional design-of-experiments techniques, an orthogonal array is a table of integers whose column elements (1, 2 and 3) represent the low, medium, and high levels of column factors. Each row of the orthogonal array represents an experimental condition to be tested. For example, the $L_9$ orthogonal array is composed of nine experimental runs that can be assigned to four factors with each factor being divided into three levels.

As TABLE 1, if the columns of an orthogonal array are treated as the responses and the levels as the weights of responses, then an orthogonal array can be treated as a weight matrix with the rows being equipment to different weight-ratios of responses. The optimal weight-ratio is obtained when the total-response function is optimized. This method leads to an unique solution and thus eliminates the uncertainty of decision maker's expressing preference.

TABLE 1

$L_9$ Orthogonal Array

| Experiment Number | Column 1 | Column 2 | Column 3 | Column 4 |
|---|---|---|---|---|
| 1 | 1 | 1 | 1 | 1 |
| 2 | 1 | 2 | 2 | 2 |
| 3 | 1 | 3 | 3 | 3 |
| 4 | 2 | 1 | 2 | 3 |
| 5 | 2 | 2 | 3 | 1 |
| 6 | 2 | 3 | 1 | 2 |
| 7 | 3 | 1 | 3 | 2 |
| 8 | 3 | 2 | 1 | 3 |
| 9 | 3 | 3 | 2 | 1 |

Conventional technique of design-of-experiments can solve single-response or single-objective optimization problems only. The above multiple-response or multiple-objective cases, therefore normally the problem are solved by the preference or judgement of decision-makers. As the optimal solution obtained is subject to the change of assessment of decision-makers and thus the solution is not unique due to the uncertainty of preference expression of decision-makers. The optimal solution will be relied on the preferences of process engineers and will be subjected to change of different engineers because of the uncertainty of preference expression. Accordingly, there is a need for an optimization-based rule for use in manufacturing semiconductor integrated circuit device that improves process yield.

SUMMARY OF THE INVENTION

In accordance with the present invention, a method is provided for evaluating design-of-experiment that substantially reduces a lot of unnecessary experiments. The solution procedure is described as below statement using some cases related about polysilicon deposition and device fabrication process as the samples to illustrate the implementation of this invention. Also, in the embodiment, the present invention is proposed to solve the problem of uncertain preferences from decision-makers. This invention will optimize the weight or the relative importance of each attribute with respect to process conditions and thus does not need any preference from process engineers herein.

Therefore, according to the above description, this invention is for solving multiple-criteria problems of very-large-semiconductor-integration (VLSI) manufacturing process. Generally VLSI process optimization is inherently a multiple-objectives problem because the process engineers always want to attain more than one objective at the same time. Especially, the Taguchi Method is the most effective design-of-experiments (DOE) method but its application is limited to single-objective problems only.

The proposed method assigns an Orthogonal Array (OA) as the weight array to each experimental condition and the optimum weights are obtained when the defined quality index is optimized. This method leads to a unique solution and thus eliminates the uncertainty of decision makers' expressing preference.

BRIEF DESCRIPTION OF THE DRAWINGS

The foregoing aspects and many of the attendant advantages of this invention will become more readily appreciated as the solution procedure becomes better understood by reference to the following detailed description, when taken in conjunction with the accompanying drawings, wherein:

FIGS. 2 to 8 are flow diagrams illustrating the first embodiment of optimization method according to the present invention;

FIG. 9 illustrates the comparison result between this invention and other methods;

FIGS. 11 to 16 are flow diagrams illustrating the second embodiment of optimization method according to the present invention. and

DESCRIPTION OF THE PREFERRED EMBODIMENT

The method of the present invention is applied to a broad range of design-of-experiments and can be optimized from a variety of related inventions. The following description discusses several presently preferred embodiments of the method of the present invention as implemented in the VLSI process, since the majority of currently available semiconductor devices are fabricated in a foundry and the most commonly encountered applications of the present invention will involve problems from the trial and error method. Nevertheless, the present invention may also be advantageously employed in any sort of semiconductor device. Accordingly, application of the present invention is not only intended to be limited to those devices fabricated in silicon semiconductor materials, but also will include those devices fabricated in one or more of the available semiconductor materials.

Thus, the following is a description of the present invention. The invention will firstly be described with reference to one exemplary structure. Some variations will then be described as well as advantages of the present invention. Some preferred methods of fabrication will then be discussed. An alternate, asymmetric embodiment will then be described along with the variations in the process flow to fabricate this embodiment. VLSI PROCESS OPTIMIZATION USING TAGUCHI METHOD WITH MULTIPLE-CRITERIA APPROACH by Ming-Ru Chen et al., 1998 IEEE, is incorporated herein by reference.

Figure 1:
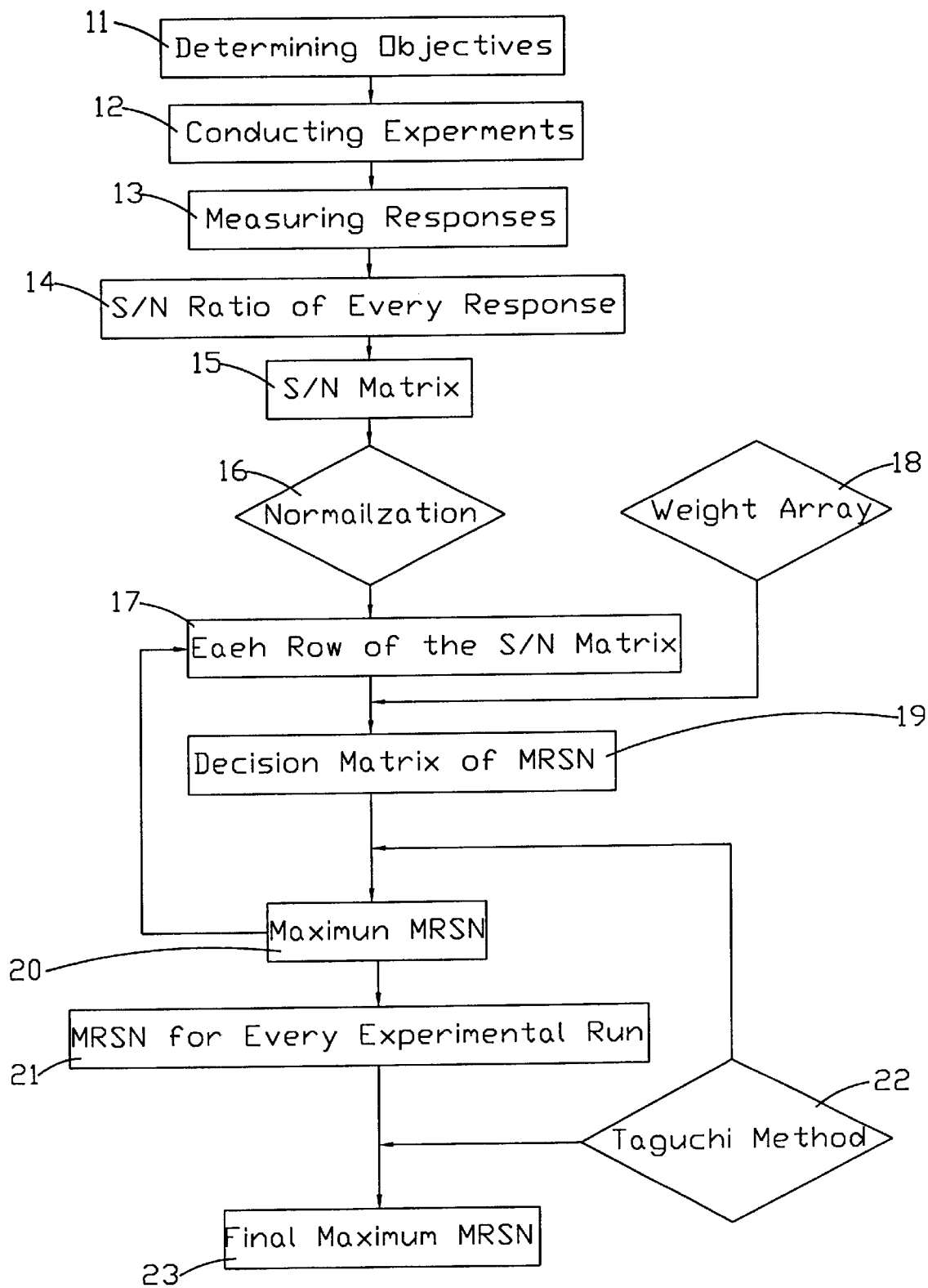
FIG. 1 shows a flow-chart for optimization process of the present invention.

FIG. 1 illustrates a flow chart the present invention. As set forth in the figure, whole flow chart are the following shown as legends respectively. The processes are firstly generated from determining objectives 11 to conducting experiments 12, then measuring responses 13. The next step to obtain S/N ratio of every response 14, then the step is S/N matrix 15. S/N (signal-to-noise) ratio is the values of design parameters which are listed in an Orthogonal Array table of design-of-experiment, so that S/N ratio is evaluated for the performance of design parameters. Consequentially normalization 16 is carried out and each row of the S/N matrix 17 is obtained. Sequentially weight array 18 and then decision matrix of multiple-responses signal-to-noise (MRSN) 19 are completed respectively. Normally, the MRSN can be obtained by the following:

$$MRSN = \sum_{i=1}^{6} (w_i \times \eta_i),$$

$\omega_i$ is assigned as the weight, $\eta_i$ is the signal-to-noise ratio. Then maximum MRSN 20 is carried out as well as MRSN for every experimental run 21. Next, the Taguchi method 22 will be employed for this invention. Finally, the final maximum MRSN 23 can be achieved.

Figure 6:
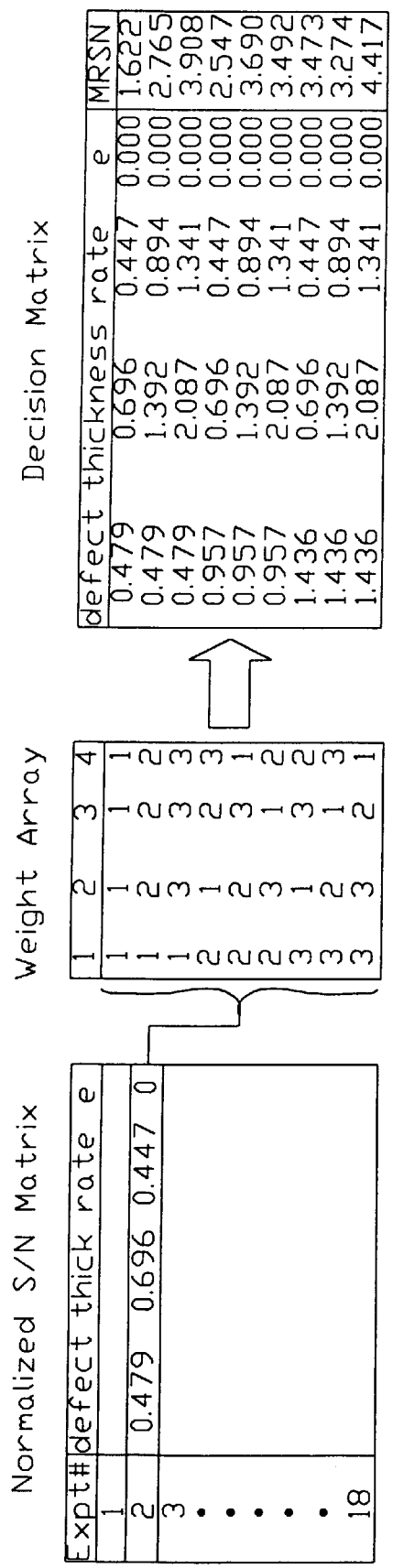
Figure 7:
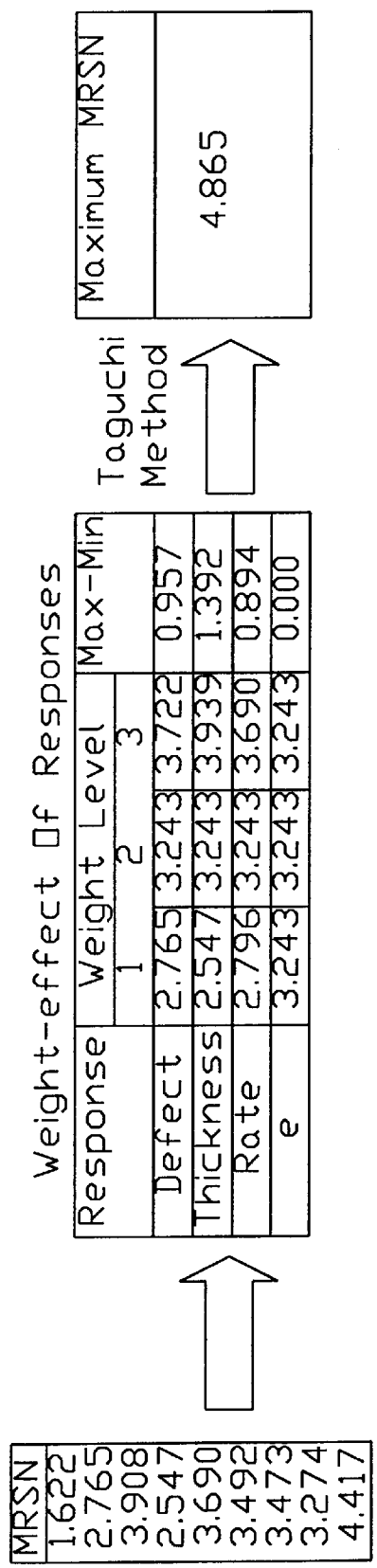
Figure 8:
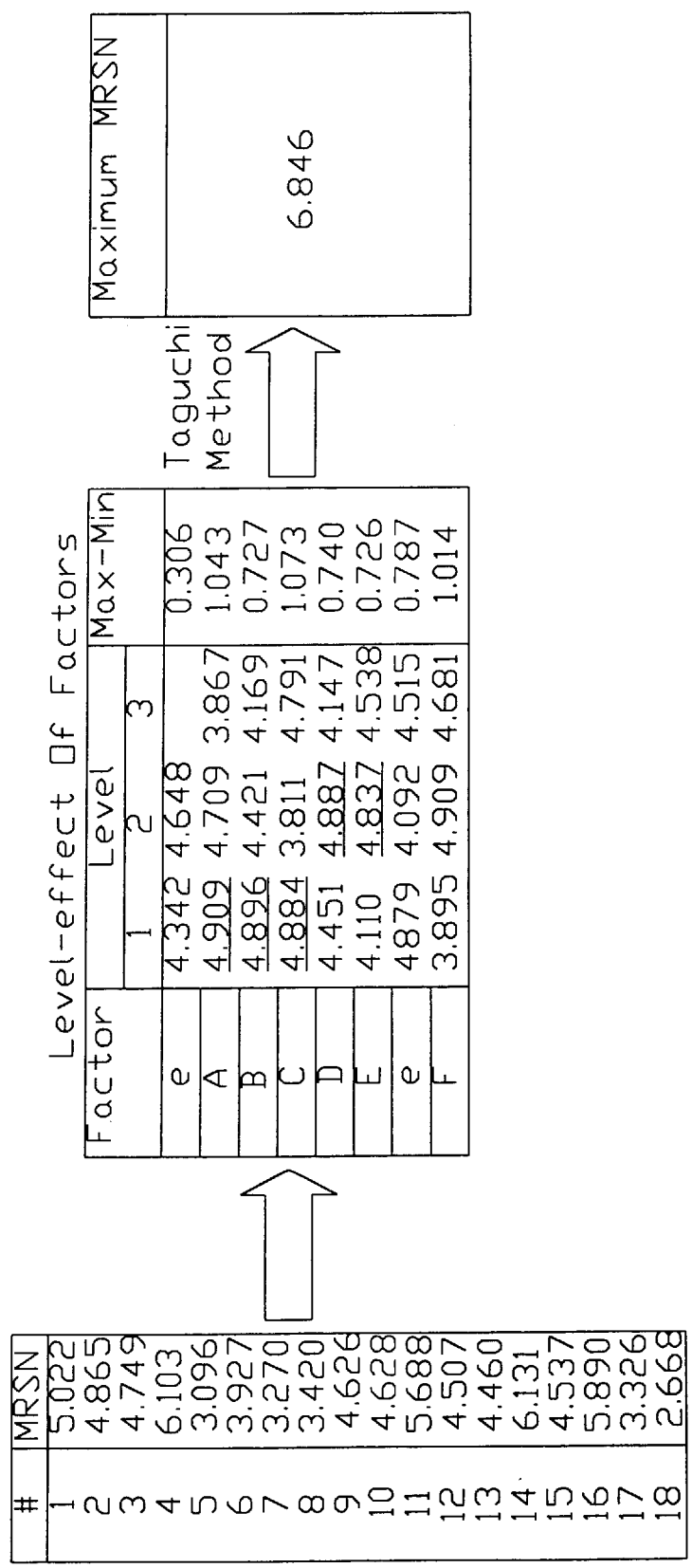

Also, the results are generated according to the above flow chart, and all of them can be indicated respectively as the following:

1. Conducting experiments is carried out according to the conditions' setup by Orthogonal Array (OA) as FIG. 2.
2. The responses are measured and the raw data of responses is transformed into a S/N matrix as FIG. 3.
3. The S/N matrix is normalized as FIG. 4.
4. A proper OA is assigned as the weight matrix illustrated as FIG. 5.
5. The next step for each row of the S/N matrix will be the following:
    (1) The matrix multiplication of the row and the weight matrix is obtained as the decision matrix of MRSN, as FIG. 6.
    (2) From the decision matrix, the maximum MRSN is obtained by using additive model of Taguchi Method, as FIG. 7. Therefore:
6. Repeating the above sixth step for each row of the S/N matrix until a matrix of maximum MRSN is obtained. Finally:
7. The final maximum MRSN will be obtained from the matrix of maximum MRSN by using the additive model of the Taguchi Method, as shown in FIG. 8.

Therefore, from the above operation, the first embodiment of the invention is based on the multiple-response S/N (MRSN), with the weight of each criteria being optimized with respect to experimental conditions by using the Taguchi method. The solution that satisfies the criteria simultaneously cannot be fully obtained. The trade-off between quality and productivity is made based on the judgement of the experimenters. The final optimal solution is decided as $A_1B_1C_1D_2E_2F_2$ of the orthogonal array. And then it is compared to Phadke's Study, such as $A_2B_2C_1D_3E_1F_1$ of the orthogonal array in the same starting condition as FIG. 9(a). Particularly, the comparison result will be shown as the following FIG. 9(b). After being compared with the study of other methods, the present invention is superior in that the weight ratio of the attribute is optimized with respect to experimental conditions, and thus no predefined weight-ratio is needed during the course of searching for the optimal solution.

Figure 10:
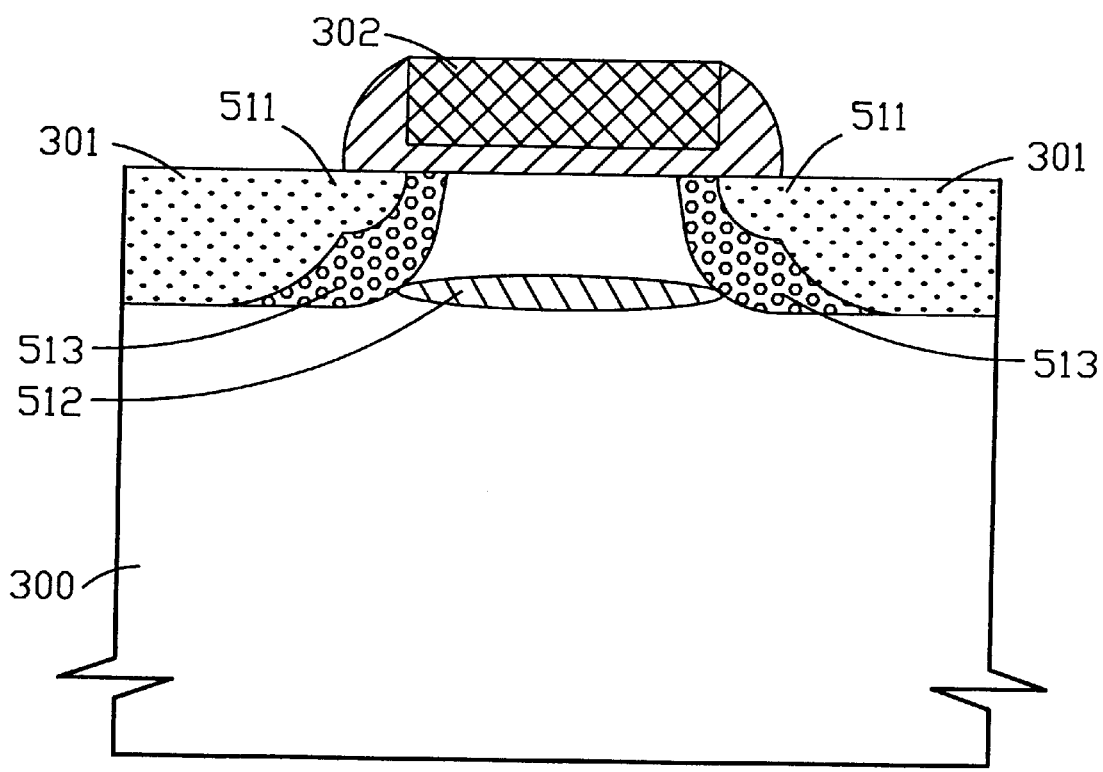
FIG. 10 is a structure of/the test device of the second embodiment.

Therefore, this invention can also provide another embodiment for VLSI process applications and these applications of this invention will be described as follows. The second embodiment at a test device of 0.25 um NMOS is fabricated and the electrical parameters are obtained as FIG. 10. The initial structure is an n-channel LDD MOSFET with conventional channel implant, LDD implant 511, substrate 300, source/drain implant 301, and gate 302.

The goal of this embodiment is to search for the modified process condition which optimize the desired electrical properties. To improve the device performance the process steps are intentionally modified to include APT (anti-punchthrough) implant 512 and HALO implant 513 to suppress the short channel effect.

There are eight control factors selected and listed as FIG. 11. These include (a) NLDD annealing temperature, (b) dose of APT implant, (c) energy of NLDD implant, (d) dose of NLDD implant (e) tilt angle of NLDD implant (f) energy of HALO implant, (g) dose of HALO implant, and (h) tilt angle of HALO implant. The six quality characteristics can be optimized, which are threshold voltage ($V_{th}$), drain induced barrier lowering (DIBL), breakdown voltage ($V_{bd}$), saturation current ($I_{sat}$), leakage or off-current ($I_{off}$), and substrate current ($I_{sub}$). The measuring conditions of these electrical parameters are listed in FIG. 12. Therefore, as FIG. 13, the $L_{18}$ orthogonal array is selected to design the experiments because of eight control factors to be assigned.

According to the selected experimental data, after the experimental data are obtained, the solution procedure for the multiple-response device optimization problem is described as below:

1. Transform the experimental data into signal-to-noise (S/N) ratios, as are defined by Taguchi Method. The resulting S/N ratios are summarized in FIG. 14.
2. Normalize the S/N ratios of each objective according to the following formula so that larger values indicate better performance:

$$\overline{\eta_i} = \frac{\eta_i - \eta_i^{min}}{\eta_i^{max} - \eta_i^{min}}, i = 1, \ldots, 18.$$

FIG. 15 lists the normalized S/N ratios of each objective.

3. Obtain the multiple-response S/N ratio (MRSN) of each experiment by the following definition:

$$MSRN = \sum_{i=1}^{6}(w_i \times \overline{\eta_i}),$$

wherein $\omega_i$ is the weight assigned to the i-th objective and indicates the relative importance of that objective. The optimal weight-ratio of each experiment is obtained by the following procedure.

4. Each objective of the experiment can be treated as a control factor and a proper array is selected as the weight matrix of the experiment. There are six objectives to be optimized and the $L_{18}$ OA is selected as the weight matrix. The optimal weight-ratio of each experiment is obtained when MRSN is maximized by using the Taguchi Method. The maximal MRSN of each experiment is listed in the rightest column of FIG. 15.

The multiple-objective problem is now transformed into a single-objective problem with MRSN being the quality index to be maximized. The Taguchi Method is used again to search for the optimum condition of the entire experimental design. Therefore the final optimum condition is obtained as $A_2B_3C_2D_3E_3F_2G_2H_2$ of the orthogonal array.

FIG. 16 shows the comparison between the result of initial and optimum conditions. Also the improvement effect can obviously obtained from FIG. 16. Especially, it will be mentioned that orthogonal array will include many sorts of orthogonal array, such as $L_9$-type and $L_{18}$-type and any other matrix-type orthogonal array.

Although specific embodiments have been illustrated and described, it will be obvious to those skilled in the art that various modifications may be made without departing from what is intended to be limited solely by the appended claims.

What is claimed is:

1. A method for solving multiple criteria problems of very-large-semiconductor-integration (VLSI) manufacturing, process therefore the conditions setup by orthogonal array (OA) then measuring responses as well as transforming raw data of responses hereinto a S/N ratio matrix thereafter said factors being simplified as single number therefrom, the method comprising:

providing a signal-to-noise (S/N) ratio and weight array tables using the Taguchi Method, wherein said signal-to-noise (S/N) ratio is obtained from a different combination of each VLSI manufacturing parameter for VLSI manufacturing process;

normalizing said S/N ratio thereafter;

assigning a proper OA as a weight matrix;

calculating each row of said S/N ratio matrix, herein for each row of said S/N ratio matrix comprising:

obtaining the matrix multiplication of the row and the weight matrix as the decision matrix of multiple-responses S/N;

obtaining the maximum multiple-responses S/N from the decision matrix by using additive model of said Taguchi Method;

repeating said calculating each row of S/N ratio matrix until a matrix of maximum multiple-responses S/N is obtained; and obtaining the final maximum multiple-responses S/N from the matrix of maximum multiple-responses S/N by using the additive model of said Taguchi Method so that solving the multiple-criteria problem from said each VLSI manufacturing parameter of said VLSI manufacturing process thereafter a product of said VLSI manufacturing process is obtained.

2. The method according to claim 1, wherein said weight array comprises $L_9$ orthogonal array.

3. The method according to claim 1, wherein said weight array comprises $L_{18}$ orthogonal array.

4. The method according to claim 1, wherein said weight array comprises matrix-type orthogonal arrays.

5. A method for optimizing multiple-response design-of-experiments for VLSI manufacturing process therefore the conditions setup by orthogonal array (OA) then measuring responses as well as transforming raw data of responses hereinto a S/N ratio matrix thereafter said factors being simplified as single number therefrom, the method comprising:

providing a signal-to-noise (S/N) ratio and weight array tables using the Taguchi Method, wherein said signal-to-noise (S/N) ratio obtained from a different combination of each VLSI manufacturing parameter for VLSI manufacturing process;

normalizing said S/N ratio thereafter;

assigning a proper OA as a weight matrix;

calculating each row of said S/N ratio matrix, herein for each row of the S/N ratio matrix comprising:

obtaining the matrix multiplication of the row and the weight matrix as the decision matrix of multiple-responses S/N;

obtaining the maximum multiple-responses S/N from the decision matrix by using additive model of said Taguchi Method;

repeating said calculating each row of S/N ratio matrix until a matrix of maximum multiple-responses S/N is obtained;

obtaining the final maximum multiple-responses S/N from the matrix of maximum multiple-responses S/N by using the additive model of said Taguchi Method so that optimizing the multiple-criteria from said each VLSI manufacturing parameter of said VLSI manufacturing process thereafter a product of said VLSI manufacturing process is obtained.

6. The method according to claim 5, wherein said weight array comprises $L_9$ orthogonal array.

7. The method according to claim 5, wherein said weight array comprises $L_{18}$ orthogonal array.

8. The method according to claim 5, wherein said weight array comprises matrix-type orthogonal arrays. maximum MRSN by using the additive model of Taguchi Method.

9. An optimization method for use in fabricating a semiconductor integration circuit device, wherein a plurality of factors are waiting to undergo optimization process so that conducting experiments according to the conditions setup by orthogonal array (OA) then measuring responses as well as transforming raw data of responses hereinto a S/N matrix thereafter said factors being simplified as single number therefrom, the method comprising:

providing a signal-to-noise (S/N) ratio and weight array tables using the Taguchi Method, wherein said signal-to-noise (S/N) ratio obtained from a different combination of each VLSI manufacturing parameter for VLSI manufacturing process;

normalizing said S/N ratio thereafter;

assigning a proper OA as a weight matrix;

calculating each row of said S/N matrix, herein for each row of the S/N matrix comprising:

obtaining the matrix multiplication of the row and the weight matrix as the decision matrix of multiple-responses S/N;

obtaining the maximum multiple-responses S/N from the decision matrix by using additive model of said Taguchi Method;

repeating said calculating each row of S/N matrix until a matrix of maximum multiple-responses S/N being obtained;

obtaining the final maximum multiple-responses S/N from the matrix of maximum multiple-responses S/N by using the additive model of Taguchi Method so that optimizing the multiple-criteria from said each VLSI manufacturing parameter of said VLSI manufacturing process thereafter a product of said VLSI manufacturing process is obtained.

10. The method according to claim 9, wherein said weight array comprises $L_9$ orthogonal array.

11. The method according to claim 9, wherein said weight array comprises $L_{18}$ orthogonal array.

12. The method according to claim 9, wherein said weight array comprises matrix-type orthogonal arrays.

* * * * *